(12) United States Patent
Murali

(10) Patent No.: US 9,350,393 B2
(45) Date of Patent: May 24, 2016

(54) DE-EMPHASIS FILTERING AUDIO SIGNALS IN RESPONSE TO COMPOSITE CONTROL SIGNAL

(75) Inventor: Sriram Murali, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 771 days.

(21) Appl. No.: 12/721,293

(22) Filed: Mar. 10, 2010

(65) Prior Publication Data

US 2010/0232482 A1   Sep. 16, 2010

(30) Foreign Application Priority Data

Mar. 16, 2009   (IN) .............................. 583/CHE/2009

(51) Int. Cl.
*H04B 1/034* (2006.01)
*H04B 1/04* (2006.01)
*H04L 27/12* (2006.01)

(52) U.S. Cl.
CPC .............. *H04B 1/034* (2013.01); *H04B 1/0475* (2013.01); *H04L 27/12* (2013.01)

(58) Field of Classification Search
CPC .......... H04B 1/04; H04B 1/0475; H04B 1/02; H04B 1/00; H04B 1/034; H04B 1/1027; H04B 14/006; H04B 14/005; H03F 1/3247; H03F 1/0277; H03F 1/0205; H03F 3/211; H03F 3/24; H03F 2201/3233; H04L 27/368; H04L 25/03343; H04L 27/20; H04L 27/12; H03C 5/00; H03C 3/02; H03C 3/18

USPC ........ 381/16, 2, 13, 10, 3; 700/94; 455/114.2, 455/112

See application file for complete search history.

(56) References Cited

U.S. PATENT DOCUMENTS

| | | | | |
|---|---|---|---|---|
| 4,103,243 A * | 7/1978 | Orban | ........................... | 327/309 |
| 4,593,402 A * | 6/1986 | Parker | ............................ | 381/16 |
| 6,208,845 B1 * | 3/2001 | Yoshida | .................... | 455/114.2 |
| 6,246,885 B1 * | 6/2001 | Black et al. | ................ | 455/553.1 |
| 7,920,835 B2 * | 4/2011 | Miyagi | ......................... | 455/112 |
| 2005/0038664 A1 * | 2/2005 | Srinivas et al. | ............... | 704/501 |
| 2007/0016316 A1 * | 1/2007 | Hanna | ............................ | 700/94 |
| 2008/0187142 A1 * | 8/2008 | Furumoto et al. | .............. | 381/14 |
| 2008/0285761 A1 * | 11/2008 | Mano et al. | ........................ | 381/3 |

* cited by examiner

*Primary Examiner* — Ping Lee
(74) *Attorney, Agent, or Firm* — Lawrence J. Bassuk; Frank D. Cimino

(57) ABSTRACT

Digital values representing an audio signal are formed in a FM transmitter. The deviation of the amplitude of the audio signal as represented by the digital values, from a reference amplitude level, is measured. The audio signal is filtered based on the deviation measured by processing the digital values, with the filtering designed to filter different frequency components of the audio signal with different respective magnitudes. Another set of digital values representing the filtered audio signal is generated, and used to frequency modulate a carrier signal to generate a FM signal. Over-modulation of the FM signal is thereby controlled.

12 Claims, 5 Drawing Sheets

DE-EMPHASIS FILTERING AUDIO SIGNALS IN RESPONSE TO COMPOSITE CONTROL SIGNAL

RELATED APPLICATION(S)

The present application claims the benefit of co-pending India provisional application serial number: 583/CHE/2009, entitled: "Method and Apparatus for Adaptive Audio De-emphasis Based Over-modulation Protection in FM Transmitters", filed on 16 Mar. 2009, naming Texas Instruments Inc. (the intended assignee) as the Applicant, and naming the same inventor as in the present application as inventor, and is incorporated in its entirety herewith.

BACKGROUND

1. Technical Field

Embodiments of the present disclosure relate generally to FM transmitters, and more specifically to controlling over-modulation in FM transmitters.

2. Related Art

Frequency Modulation (FM) refers to modulation of the frequency of a carrier signal in proportion to the instantaneous amplitude of a message signal. The bandwidth of a FM signal increases with increase in message signal amplitude.

FM transmission/broadcast standards specify the allowable center frequencies for the carrier signals and a maximum allowable bandwidth that can be occupied by the frequency modulated signal. Over modulation refers to a situation in which the bandwidth occupied by a FM signal exceeds the maximum allowable bandwidth, and accordingly the FM signal is said to be over-modulated.

Over-modulation may have undesirable effects such as interference with FM signals on adjacent FM bands. It is, therefore, desirable that over-modulation be controlled in FM transmitters.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

Digital values representing an audio signal are formed in a FM transmitter. The deviation of the amplitude of the audio signal as represented by the digital values, from a reference amplitude level, is measured. The audio signal is filtered based on the deviation measured by processing the digital values, with the filtering designed to filter different frequency components of the audio signal with different respective magnitudes. Another set of digital values representing the filtered audio signal is generated, and used to frequency modulate a carrier signal to generate a FM signal.

Several aspects are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

BRIEF DESCRIPTION OF THE VIEWS OF DRAWINGS

DETAILED DESCRIPTION

Various embodiments are described below with several examples for illustration.

1. Example Device

Figure 1:
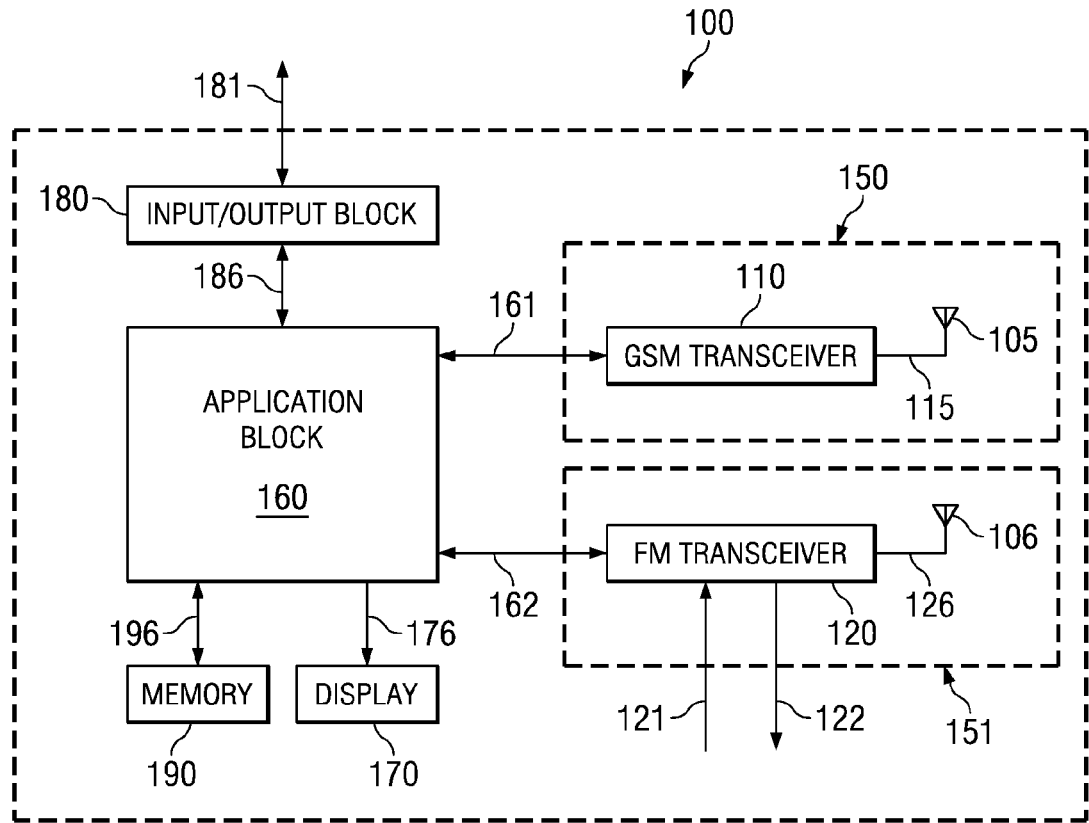
FIG. 1 is a block diagram of an example device in which several embodiments can be implemented.

FIG. 1 is a block diagram of an example device in which several aspects of the present disclosure can be implemented. The block diagram shows mobile phone 100, which is in turn shown containing GSM (Global System for Mobile Communication) block 150, FM block 151, application block 160, display 170, input/output (I/O) block 180, and memory 190. The components/blocks of mobile phone 100 in FIG. 1 are shown merely by way of illustration. However, mobile phone 100 may contain more or fewer components/blocks. Further, while in the examples below, over-modulation control techniques are described with respect to FM transceivers in mobile phones, the techniques can be applied in the context of FM transceivers in other environments as well.

GSM block 150 is shown containing GSM transceiver 110 and transmit antenna 105. FM block 151 is shown containing FM transceiver 120 and transmit antenna 106. GSM block 150, and FM block 151 may contain respective receive antennas and filters as well, but are not shown in FIG. 1.

Blocks 110 and 120 may be implemented, for example, as separate integrated circuits (IC), or implemented within a same IC. Typically, antennas 105 and 106 (as well as one or more of components such as filters assumed to be contained within blocks 110 and 120) of FIG. 1 are mounted on a printed circuit board (PCB), with corresponding PCB trace providing the electrical connectivity represented by paths 115 and 126.

GSM block 150 operates to provide wireless telephone operations, with GSM transceiver 110 containing receiver and transmitter sections to perform the corresponding receive and transmit functions. FM block 151 operates to transmit and receive FM audio signals according to FM broadcast/receive standards.

Application block 160 may contain corresponding hardware circuitry (e.g., processors), and operates to provide various user applications provided by mobile phone 100. The user applications may include voice call operations, data transfers, providing positioning information, etc. Application block 160 may operate in conjunction with blocks 150 and 151 to provide such features, and communicates with the respective blocks 150 and 151 via paths 161 and 162 respectively.

Display 170 displays image frames in response to the corresponding display signals received from application block 160 on path 176. The images may be generated by a camera provided in mobile phone 100, but not shown in FIG. 1. Display 170 may contain memory (frame buffer) internally for temporary storage of pixel values for image refresh purposes, and may be implemented, for example, as a liquid crystal display screen with associated control circuits. Input/Output (I/O) block 180 provides a user with the facility to provide inputs via path 181, for example, to dial numbers. In addition, I/O block 180 may provide on path 181 outputs that may be received via application block 160 via path 186. Such outputs may include data, voice, images etc. I/O block 180 communicates with application block 160 via path 186.

Memory 190 stores program (instructions) and/or data (provided via path 196) used by applications block 160, and may be implemented as RAM, ROM, flash, etc, and thus contains volatile as well as non-volatile storage elements, and represents a computer (or a machine) readable medium.

FM transceiver 120 may include FM transmitter as well as FM receiver sections, and receives audio signals (for example from microphones, not shown) on path 121. Path 121 is deemed to contain at least two separate paths, one each for left and right audio channels of a stereo audio signal received on path 121. FM transceiver 120 provides audio signals as output on path 122, which may, for example, be connected to a speaker (not shown). Alternatively, FM transceiver 120 may receive stereo audio signals in digital form via block I/O 180 and application block 160 on path 162, and send received (and demodulated) audio signals on path 162 to I/O block 180 via application block 160 and path 162.

Figure 2A:
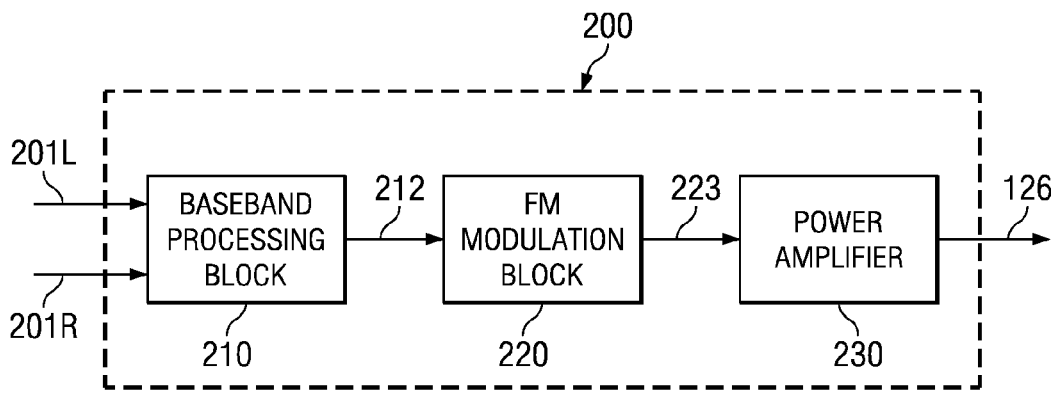
FIG. 2A is a block diagram illustrating the details of portion of a FM transmitter in an embodiment.

The implementation of a transmitter section contained in FM transceiver 120 is described next with respect to FIG. 2. FIG. 2A is a block diagram illustrating the details of FM transmitter 200 in an embodiment. FM transmitter 200 is shown containing baseband processing block 210, FM modulation block 220 and power amplifier 230.

Baseband processing block 210 is shown connected to input paths 201L and 201R on which respective channels of a stereo audio signal (referred to for convenience as audio signal 201) may be received. Baseband processing block 210 may combine signals 201L and 201R (left and right channels representing components of stereo audio signal 201) into a composite message signal, sent on path 212. The composite message signal may be formed according to FM broadcast standard specifications. Accordingly, baseband processing block 210 may perform several operations such as analog-to-digital (A/D) conversion, pre-emphasis of channels 201L and 201R, generation of a mono-audio component (generated as the average of audio channels 201L and 201R), generation of a stereo-audio component (generated as the average difference of audio channels 201L and 201R), up-conversion of the stereo-audio component, inclusion of a pilot signal (for example, at 19 kHz), inclusion of data according to protocols such as Radio Data System (RDS) protocol, DARC (DAta Radio Channel), etc.

Figure 2B:
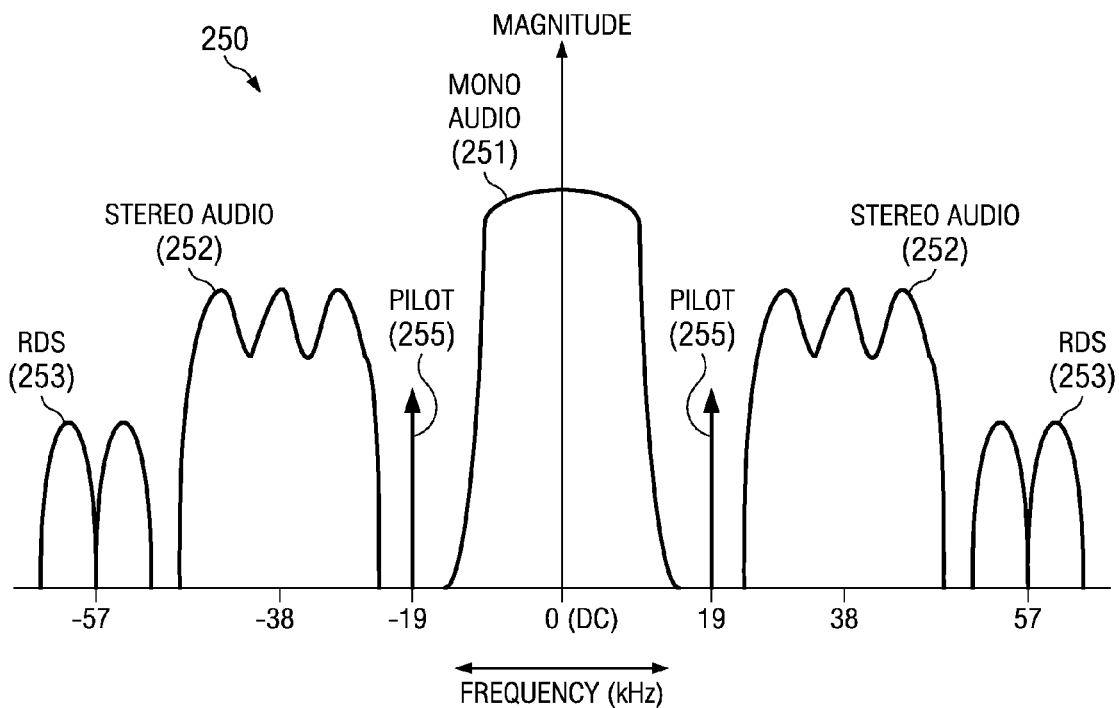
FIG. 2B is a diagram illustrating the frequency spectrum of a composite message signal according to FM standards.

The term 'composite message signal' is used to refer to a combination of a mono audio component, a stereo audio component, a pilot signal and data according to protocols such as Radio Data System (RDS) protocol, DARC (DAta Radio Channel), etc. The term 'composite audio signal' will be used to refer to a combination of a mono audio component and a stereo audio component, without pilot signal and RDS components. FIG. 2B shows the double-sided spectrum of a composite message signal 250. Frequency band 251 represents the mono audio component (which includes left and right channels of an audio signal). Frequency band 252 represents the frequency shifted stereo audio component, the frequency shifting being performed with the aid of a pilot signal 255. Frequency band 253 represents RDS data.

The composite message signal generated by baseband processing block 210 is sent to FM modulation block 220 on path 212. FM modulation block 220 frequency modulates a carrier signal (not shown, but assumed to be provided to block 220 or generated within block 220) with signal 212, and provides a FM signal to power amplifier 230 on path 223. Power amplifier 230 sends a power amplified FM signal on path 126. The power amplified signal on path 126 is transmitted by an antenna (antenna 106 of FIG. 1).

As is well-known in the relevant arts, pre-emphasis (that is performed in baseband processing block 210) amplifies higher frequencies in each of audio channels 201L and 201R to a greater extent than lower frequencies in audio channels 201L and 201R, and may be performed consistent with corresponding FM standards. However, depending on the received amplitude levels (of the various frequency components of) audio channels 201L and 201R, pre-emphasis may cause over-modulation in the FM signal, which may cause the FM modulated signal to occupy a wider bandwidth than may be allowed by the relevant FM standard(s).

Hence, it may be necessary to control the amplitude levels of frequency components (especially the higher frequency components) of the pre-emphasized audio signal so that the FM signal is not over-modulated.

2. Controlling Over-Modulation

Figure 3:
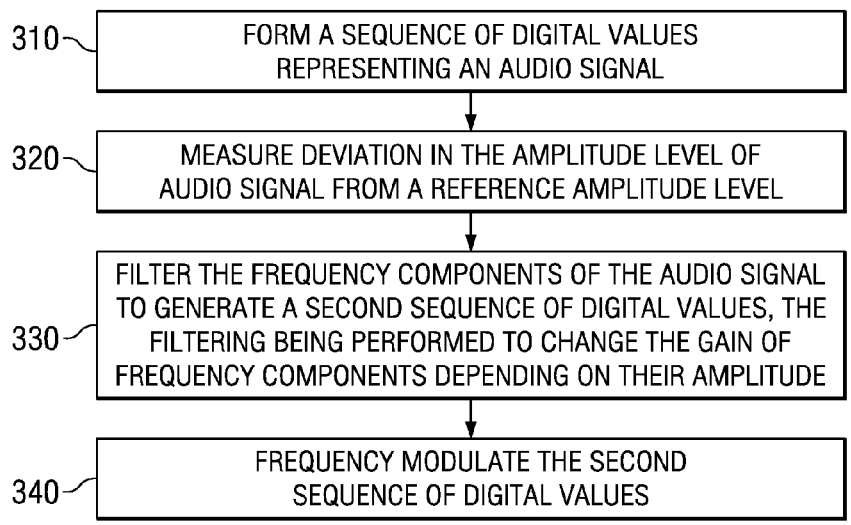
FIG. 3 is a flow diagram illustrating the manner in which over-modulation in FM transmitters is controlled in an embodiment.

FIG. 3 is a flow diagram illustrating the manner in which over-modulation in FM transmitters is controlled, in an embodiment. The steps in the flow diagram are described in a specific sequence merely for illustration. Alternative embodiments using a different sequence of steps can also be implemented without departing from the scope and spirit of several aspects of embodiments of the present disclosure, as will be apparent to one skilled in the relevant arts by reading the disclosure provided herein.

In step 310 of the flow diagram, a sequence of digital values representing an audio signal is formed. The sequence may represent a composite message signal, a composite audio signal, a stereo audio signal or a mono audio signal.

In step 320, the deviation of the maximum amplitude level of the audio signal from a reference amplitude level is measured. The reference amplitude level represents a maximum frequency deviation limit, and may be determined a priori based, for example, on the correspondence between the amplitude of an audio signal and the bandwidth occupied by the corresponding FM signal.

In step 330, the audio signal is filtered based on the measured deviation such that the gain (or attenuation) factors applied to different frequency components in the audio signal are different, depending on the frequency values of the components. A second sequence of digital values is generated as the output of the filtering of step 330.

In step 340, the second sequence of digital values is frequency modulated to generate a FM signal, which may then be transmitted.

As a result of the operations described above, frequency-dependent gain (or attenuation) factors are applied on the frequency components of an audio signal so that the bandwidth occupied by the FM signal is within the limits specified by the relevant FM standards, and over-modulation is controlled. Further, the operations described above are performed in the digital domain, and are performed using only digital blocks/components in baseband processing block 210 (shown in FIG. 2). The operations of various blocks in a baseband processing block in controlling over-modulation are described next with respect to FIG. 4.

3. Baseband Processing Block

Figure 4:
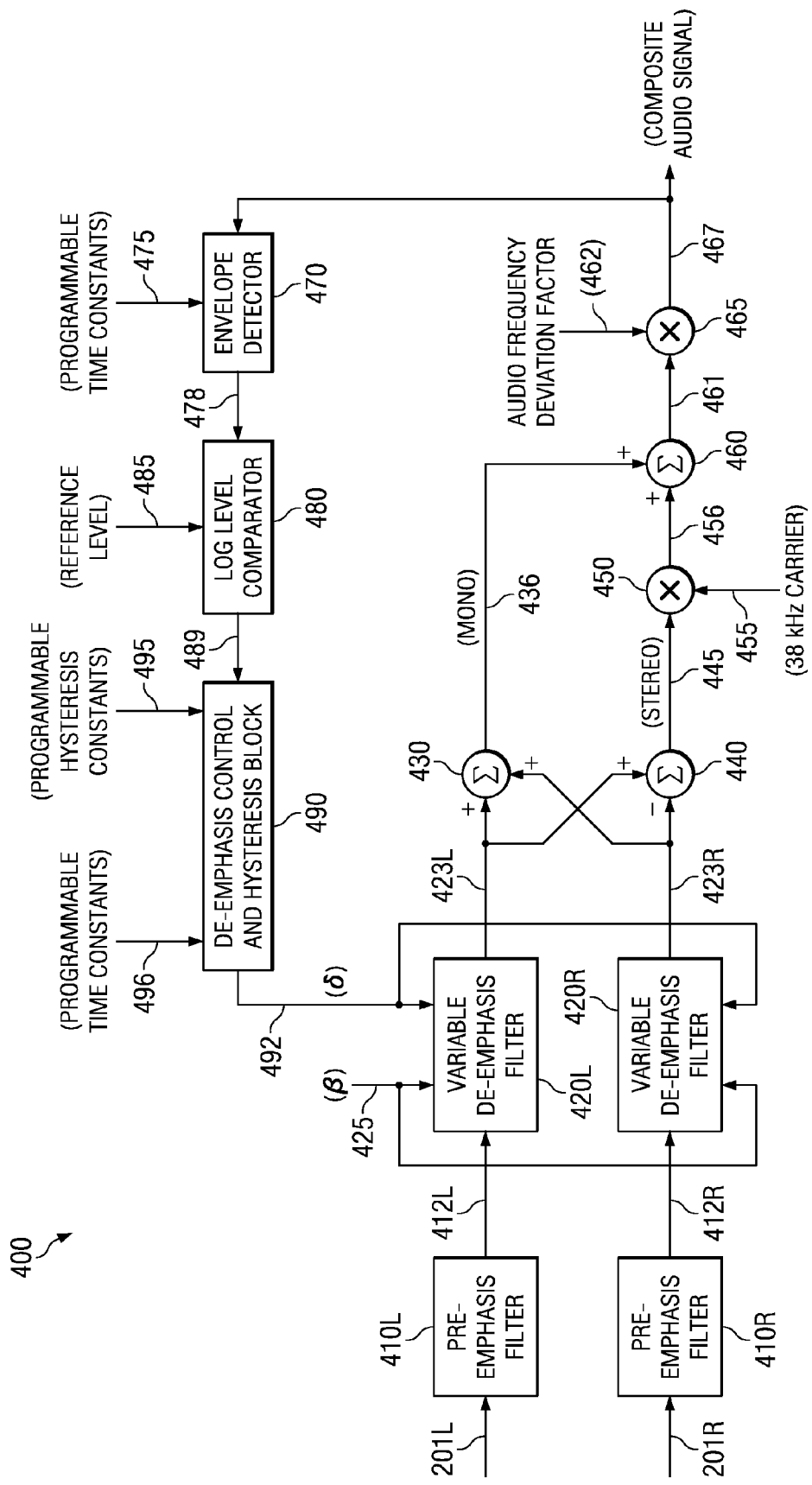
FIG. 4 is a block diagram illustrating partial details of a baseband processing block used in a FM transmitter, in an embodiment.

FIG. 4 is a block diagram illustrating the details of a baseband processing block in an embodiment. Only the blocks as relevant to control of over-modulation are shown in FIG. 4, and baseband processing block 400 of FIG. 4 may contain more processing blocks as well. Baseband processing block 400 may be implemented in place of baseband processing block 210 of FIG. 2, and is shown containing pre-emphasis filters 410L and 410R, variable de-emphasis filters 420L and 420R, summing blocks 430, 440 and 460, frequency shifters 450 and 465, envelope detector 470, log-level comparator 480 and de-emphasis control and hysteresis block 490. The operations of the blocks of FIG. 4 may be performed in corresponding sampling intervals (or time index) of a clock. Baseband processing block 400 may be implemented using software, hardware, or a combination of hardware and software. In general, when throughput performance is of primary consideration, the implementation may be done more in hardware (e.g., in the form of an application specific integrated circuit). When cost is of primary consideration, the implementation may be performed more in software (e.g., using a processor executing instructions provided in software/firmware).

Pre-emphasis filters 410L and 410R perform pre-emphasis operations on left and right audio channels 210L and 210R respectively. As is well known in the relevant arts, pre-emphasis refers to an operation in which higher frequency components of an input audio signal are amplified (emphasized) more than lower frequency components of the audio signal (prior to frequency modulation of a carrier by the audio signal), and is generally performed to enable better signal-to-noise ratio (SNR) of the FM signal at a receiving end, i.e., at a FM receiver. Pre-emphasis operations in filters 410L and 410R may be performed consistent with requirements of relevant FM standards. In one embodiment, pre-emphasis filters 410L and 410R are implemented as Finite Impulse Response (FIR) filters. The (pre-emphasized) outputs of filters 410L and 410R are provided on paths 412L and 412R to variable de-emphasis filters 420L and 420R respectively.

Variable de-emphasis filter 420L receives pre-emphasized signal 412L, and filters signal 412L based on input parameters β and δ, received respectively on paths 425 and 429. Similarly, variable de-emphasis filter 420R receives pre-emphasized signal 412R, and filters signal 412R based on input parameters β and δ. Parameter δ (which may be viewed as a control parameter) determines the attenuation (with respect to frequency) provided by each of filters 420L and 420R, and is generated/determined in a manner described below. Parameter β represents a time-constant parameter that modifies the attenuation provided by filters 420L and 420R for a given value of parameter δ.

Thus, filters 420L and 420R operate to perform frequency-dependent gain (or attenuation) control to alter the amplitude levels of frequency components of the respective pre-emphasized signals 412L and 412R. In general, the filters operate to attenuate higher frequency components to a greater extent than lower frequency components, thereby ensuring that over-modulation does not occur in FM transmitter.

In an embodiment, each variable de-emphasis filter (420L and 420R) is implemented as a digital Infinite Impulse Response (IIR) filter whose impulse response is provided in equation 1 below:

$$H(z)=((1-\beta\delta)+\beta\delta z^{-1})((1-\delta)/(1-\delta z^{-1}))$$ Equation 1 wherein, H (z) represents the transfer function (or impulse response) of each of the filters.

Respective outputs 423L and 423R of variable de-emphasis filters 420L and 420R are provided to summing block 430, which determines the average of signals 423L and 423R. The output of summing block 430, referred to as mono-audio signal, is sent to summing block 460 on path 436 (mono). The band of frequencies occupied by signal 436 corresponds to frequency band 251 shown in FIG. 2B.

Outputs 423L and 423R are also provided to summing block 440, which determines the average difference between signals 423L and 423R. Stereo-audio signal 445 (Stereo) output by summing block 440 is frequency-shifted in frequency shifter 450 to a higher frequency band to spectrally separate signal 436 (mono) and 445 (stereo). An oscillator output (455) is used to mix the stereo-audio signal 445 (Stereo) to perform the frequency shift in a known way. The frequency of oscillator output 455 may be set as defined by the FM standards, and equals 38 KHz in an embodiment. The output of frequency shifter 450 is provided on path 456 to summing block 460. Signal 456 represents the frequency-shifted stereo signal formed from left and right channels 201L and 201R. The band of frequencies occupied by signal 456 corresponds to frequency band 252 shown in FIG. 2B.

Summing block 460 adds mono-audio signal 436 (mono) and frequency shifted stereo-audio signal on path 456 to form signal 461 containing both mono and stereo-audio signals. Frequency shifter 465 allows scaling of the amplitude of signal 461, thereby allowing control of the extent of frequency deviation contribution of signal 461. Frequency shifter 465 receives a scaling factor (audio frequency deviation factor) on path 462 to provide the scaling, and generates composite audio signal 467.

Composite audio signal 467 may correspond to signal 212 of FIG. 2. In other embodiments, RDS/DARC data may be added to signal 467 prior to further forwarding and processing (which may include the operations performed by blocks 220 and 230 of FIG. 2), as well as those in blocks described below. Although in the description below blocks 470, 480 and 490 are noted as operating based on composite audio signal 467 as input, in other embodiments signals 436 (mono) and/or signal 445 (stereo) may instead be provided as the input, with corresponding modifications in the operation of blocks 470, 480 and 490. In other embodiments, a composite message signal consisting of composite audio signal 467 and pilot 256 (FIG. 2B) and/or RDS/DARC data can also be used as input to block 470. In such alternative embodiments, the value of reference level 485 (described below) would be changed accordingly.

Envelope detector 470 may be implemented as a low pass filter and generates the envelope of signal 467. Thus, envelope detector 470 computes the absolute value of the amplitude of the envelope in corresponding time (operation) intervals. The computed absolute value of the amplitude of the envelope is a measure of the frequency deviation that would be caused in a carrier signal that is modulated by signal 467 (for example in block 220 of FIG. 2). In an embodiment, envelope detector 470 is implemented using a dual-mode single-pole low-pass IIR filter, and receives programmable time constants $\alpha_C$ (charge coefficient) and $\alpha_D$ (discharge coefficient) on path 475. The absolute value of the amplitude of the envelope is determined according to the equations provided below:

$$l(n)=|x(n)|+\alpha_C(l(n-1)-|x(n)|), |x(n)|>l(n-1)$$ Equation 2A $$l(n)=|x(n)|+\alpha_D(l(n-1)-|x(n)|), |x(n)|\leq l(n-1)$$ Equation 2B wherein,
'n' represents a current sampling interval/time index,
l(n) represents the current sample at the envelope detector output,
x(n) represents the current sample at the envelope detector input,
l(n−1) represents the previous sample at the envelope detector output, and.
'||' represents an absolute-value operation.

Time constants $\alpha_C$ and $\alpha_D$ are used to ensure fast charging and slow-discharging behavior in envelope detector 470. The output of envelope detector 470 is provided to log level comparator 480 on path 478.

Log level comparator 480 converts the absolute values received on path 478 to a logarithmic scale, and compares the absolute values (in each of corresponding operation intervals of the circuit of FIG. 4) with a reference amplitude value (which corresponds to a desired nominal frequency deviation), provided on path 485. In an embodiment, the following equation represents the comparison performed by log level comparator 480:

$$L(n) = \log_2(l(n)/I_{Nom}) = \log_2(l(n)) - \log_2(I_{NOM}) \quad \text{Equation (3)}$$

wherein,

L(n) represents the result of comparison noted above, and $I_{Nom}$ represents a reference amplitude level.

The sign of L(n) indicates the direction in which the de-emphasis response (lower or greater attenuation) of variable de-emphasis filters 420L and 420R is to be moved, i.e., whether the value of parameter δ has to be increased or decreased. The magnitude of L(n) indicates the amount by which the de-emphasis has to be changed, i.e., the magnitude change required in parameter δ. Log level comparator 480 provides the result L(n) to de-emphasis control and hysteresis block 490 on path 489.

De-emphasis control and hysteresis block 490 varies the value of parameter δ depending on the output of log level comparator 480 received on path 489, programmable hysteresis constants (DELTA_HYST_UP and DELTA_HYST_DOWN) received on path 495 and programmable time constants ($\mu_A$ and $\mu_R$) received on path 496. Parameter δ is varied according to the equations provided below:

$$\delta(n) = \mu_A L(n) + \delta(n-1), L(n) > 0 \quad \text{Equation 4A}$$

$$\delta(n) = \mu_R L(n) + \delta(n-1), L(n) \leq 0 \quad \text{Equation 4B}$$

wherein, $\mu_A$ and $\mu_R$ are coefficients, and

δ(n−1) is value of parameter δ at the previous sampling interval/time index.

Equations 4A and 4B, are referred to "update equations" for convenience, and indicate the manner in which the value of δ is "updated" (in a corresponding operation interval) depending on the value of L(n). Programmable time constants $\mu_A$ and $\mu_R$ are referred to as attack and release coefficients respectively. If the value of L(n) is positive and non-zero, then the coefficient $\mu_A$ is used in the update equation (4A), whereas $\mu_R$ is used otherwise (equation 4B). δ(n) is provided as a control input to filters 420L and 420R, and thus controls the attenuation provided by the filters. Coefficients $\mu_A$ and $\mu_R$ are selected to ensure fast attack and slow release, similar to the charge/discharge coefficients in the envelope detector.

It may be appreciated from the description above that parameter δ is dynamically varied using de-emphasis control and hysteresis block 490 to control the level of de-emphasis (that is, level of attenuation of higher frequency components of the audio signal) provided by the variable de-emphasis filters 420L and 420R. In an embodiment, control parameter δ is designed to have values in a range 0 to $\delta_{max}$, with the value of $\delta_{max}$ corresponding to the frequency response of complete de-emphasis (i.e., the effect of pre-emphasis filters 410L and 410R on signals 201L and 201R respectively is completely negated). The value of $\delta_{max}$ is 1 in an embodiment. In general, the value of $\delta_{max}$ depends on the type of pre-emphasis specified in the relevant FM standard (i.e., 50 μS or 75 μS). Parameter β is used to vary the gain factors for different frequency components for a specific value of δ, and may potentially be set to different values for 50 μS and 75 μS de-emphasis, to tweak the response of filters 420L and 420R at $\delta_{max}$, to better match the desired response of complete de-emphasis.

When δ equals zero, variable de-emphasis filters 420L and 420R act as all-pass filters, providing uniform gain (or no gain at all) to all frequency components of signals 412L and 412R. When parameter δ has a non-zero value, higher frequency components of the audio signal are attenuated to a greater extent than lower frequency components. The frequency response (variation of gain factors with respect to frequency components of audio signal) of variable de-emphasis filters 420L and 420R in an embodiment is depicted in FIG. 5.

Figure 5:
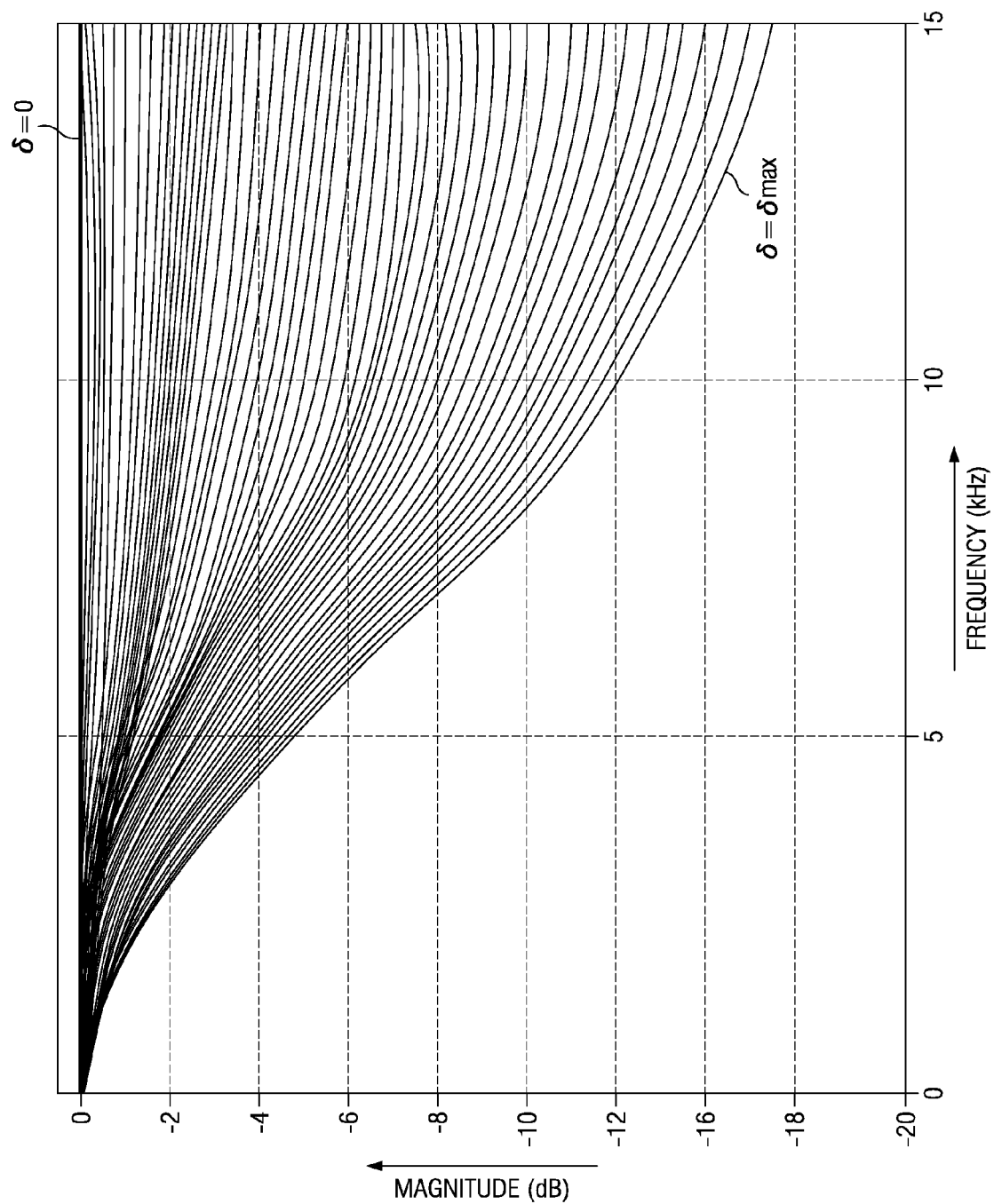
FIG. 5 is a graph depicting frequency response curves of a variable de-emphasis filter used in a FM transmitter, in an embodiment.

FIG. 5 depicts a set of curves, where each curve depicts the frequency response of variable de-emphasis filters 420L and 420R for a corresponding value of δ. The variation in frequency response corresponding to variation in the value of δ from 0 to $\delta_{max}$ is shown in FIG. 5. Frequency (in KiloHertz) is represented on the X axis, and the magnitude (in decibels) of the corresponding frequency component is represented on the Y axis.

The manner in which control parameter δ is generated (implementation of update equations 4A and 4B) in de-emphasis control and hysteresis block 490 is briefly described next with reference FIG. 6.

4. De-emphasis Control and Hysteresis

Figure 6:
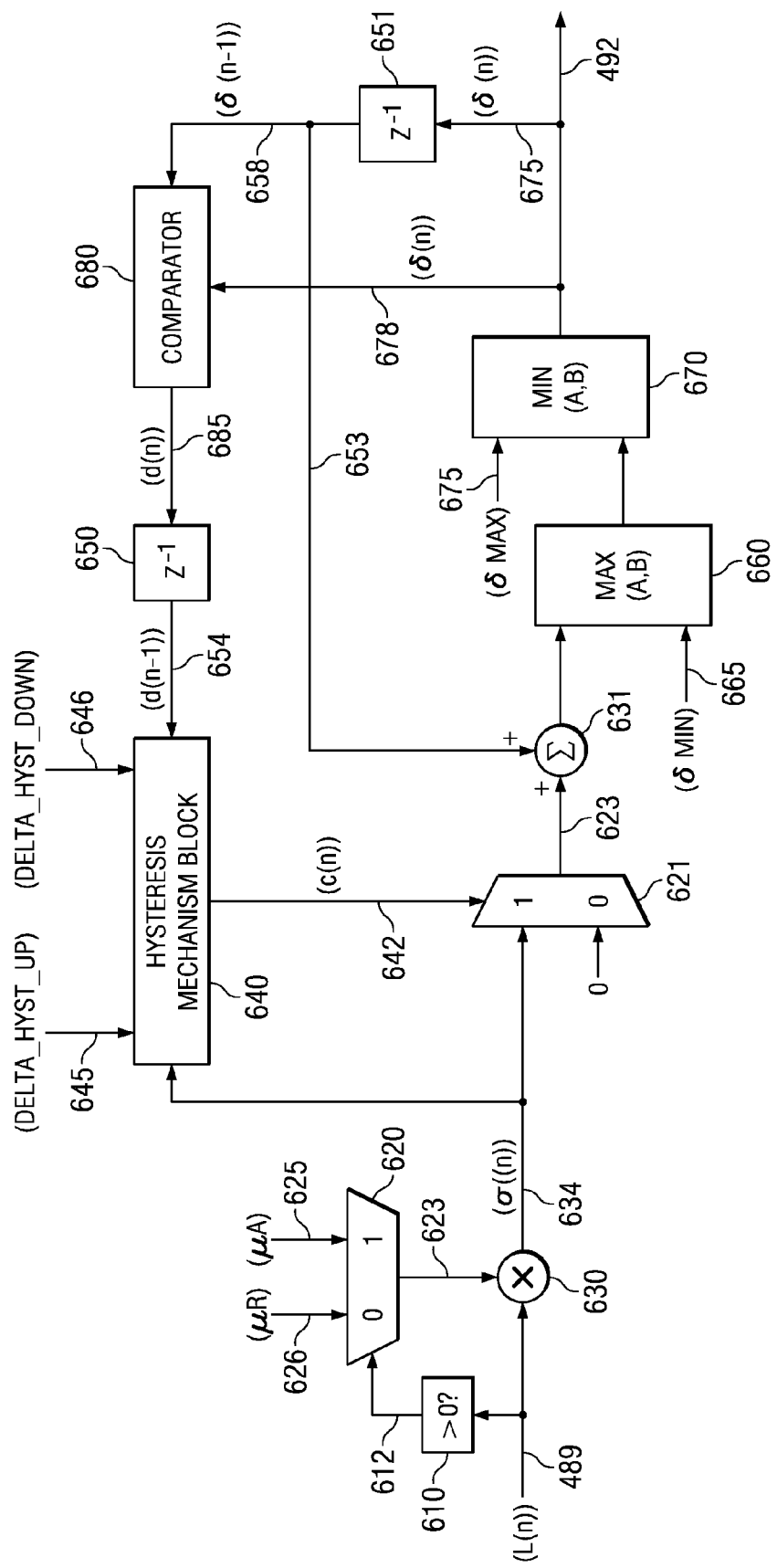
FIG. 6 is a block diagram illustrating the implementation blocks of a de-emphasis control and hysteresis block used in a FM transmitter, in an embodiment.

FIG. 6 is a block diagram illustrating the implementation blocks of a de-emphasis control and hysteresis block in an embodiment, and is shown containing hysteresis mechanism block 640, multiplexers 620 and 621, comparators 610 and 680, minimum limiter 660, maximum limiter 670, multiplier 630, summing block 631, and unit time delay blocks 650 and 651.

The value of L(n) received on path 489 from log-level comparator 480 (as described in FIG. 4) is provided to comparator 610. Comparator 610 checks if L(n) is greater than 0, and accordingly sends a signal on path 612. Path 612 acts as a select line for multiplexer 620. The two inputs to multiplexer 620 are paths 625 and 626, carrying the values of attack and release coefficients $\mu_A$ and $\mu_R$ respectively. One of the two inputs (625 and 626) is selected depending on the value provided by comparator 610 on path 612, and the selected coefficient ($\mu_A$ or $\mu_R$) is provided to multiplier 630 on path 623. Multiplier 630 multiples the values of L(n) and the selected coefficient ($\mu_A$ or $\mu_R$) to generate a 'proposed update' σ(n), which is provided on path 634 to hysteresis mechanism block 640 and to multiplexer 621.

Hysteresis mechanism block 640 uses proposed update σ(n) received on path 634, and programmable hysteresis constants DELTA_HYST_UP and DELTA_HYST_DOWN received on paths 645 and 646 respectively, to generate a signal c(n) (provided on path 642 to multiplexer 621 as a select line). Paths 645 and 646 are deemed to be contained in path 495 of FIG. 4.

The generated signal c(n) takes values based on the equation (5) provided below:

$c(n)=1,$ if $\sigma(n)h(n) \geq 0$ OR $(h(n)=-1)$ AND $(\sigma(n) > \text{DELTA\_HYST\_UP})$ OR $(h(n)=+1)$ AND $(\sigma(n) < -\text{DELTA\_HYST\_DOWN})$ $c(n)=0$, otherwise. \qquad Equation 5 wherein,

OR represents a logical OR operation,

AND represents a logical AND operation, h(n) is a hysteresis state variable which represents the direction of previous changes in parameter δ.

The values of DELTA_HYST_UP and DELTA_HYST_DOWN may be chosen to mask small fluctuations in signal 489, caused due to fluctuations in signal envelope 478, which may occur in practical implementations of envelope detector 470. In an embodiment, the values of DELTA_HYST_UP and DELTA_HYST_DOWN are 0.01 and 0.005 respectively.

h(n) is defined by equation (6) below.

$$h(n)=d(n-1) \text{ if } d(n-1) \neq 0$$

$$h(n)=h(n-1) \text{ if } d(n-1)=0 \quad \text{Equation 6}$$

wherein, $d(n-1)=\text{sign}(\delta(n-1)-\delta(n-2))$ h(0) is initialized to value 0.

Determination of d(n−1) used in equation 6 is implemented using unit time delay block 651 (from which the previous value of δ is obtained), comparator 680 (which compares the 'present' value of δ and the 'previous' value of δ to provide d(n) on path 685), and unit time delay block 650 (which provides the value of d(n−1)). The value of d(n−1) generated by unit time delay block 650 is provided on path 654 to hysteresis mechanism block 640, which uses d(n−1) to generate h(n), and further to generate c(n), which is provided to multiplexer 621 on path 642.

Multiplexer 621 is used to prevent rapid fluctuations in the value of parameter δ (i.e., to provide hysteresis), by allowing the proposed update σ(n) to be used in the update equation only when c(n) received on select line 642 is 1. If c(n) has the value 1, multiplexer 621 sends the update term σ(n) to summing block 631 on path 623, and zero otherwise. Summing block 631 adds update term σ(n) to the previous value of parameter δ to generate a new value for parameter δ. The previous value of δ (that is, δ (n−1)) is obtained from unit time delay block 651 on path 653. The generated δ value is provided to minimum limiter 660.

Minimum limiter 660 checks the generated value of δ against a minimum value $\delta_{min}$ (which may equal 0, although the specific value is programmable) received on path 665, and chooses the maximum of the two values to be the new δ value (that is, limiting the lowest value of δ to $\delta_{min}$). The output of minimum limiter 660 is provided to maximum limiter 670.

Maximum limiter 670 checks the value of δ received on path 667, against a maximum value $\delta_{max}$ received on path 675, and chooses the minimum of the two values to be the new δ value (limiting the highest value of δ to $\delta_{max}$). Minimum limiter 660 and maximum limiter 670 in conjunction act as a range control mechanism, limiting the generated value of δ between $\delta_{min}$ and $\delta_{max}$.

The range-limited δ value is provided on path 492 (shown in FIG. 4) to variable de-emphasis filters 420L and 420R, and is used by filters 420L and 420R to set their impulse response. Future outputs of filters 420L and 420R (i.e., outputs after application of the δ value on path 492) result in generation of a new sequence of digital values representing composite audio signal 467 (FIG. 4), with the mono and stereo-audio signals having their audio frequency components de-emphasized to ensure that over-modulation is controlled. The 'new' sequence of digital values is provided on path 212 (corresponding to output of baseband processing block 200 in FIG. 2) to FM modulation block 220, in which a signal represented by the 'new' sequence of digital values is frequency modulated.

The frequency dependent de-emphasis (gain control) described above limits the bandwidth occupied by a FM signal ensuring that the spectral-mask requirements imposed by relevant FM standards are met. Since the technique described above is implemented completely in the digital domain, it may be easily integrated in environments which are primarily digital, such as mobile phone 100 of FIG. 1 (in general, in low-power, small-area FM transmitters). In addition, the provision of the same value of control parameter δ to both of filters 420L and 420R ensures matching in the filtering applied on audio channels 201L and 201R, thereby ensuring no impact on stereo separation.

Although in the foregoing description, the generation of parameter δ is described as being performed based on measurement of amplitude of composite audio signal 467, in other embodiments δ may be generated based on independent measurement of audio channels 201L and 201R. Correspondingly, a pair of δ values may then be generated and applied independently as control parameters for setting the impulse response of filters 420L and 420R.

References throughout this specification to "one embodiment", "an embodiment", or similar language mean that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. Frequency modulated baseband circuitry comprising:
   (A) left audio channel pre-emphasis filter circuitry having an output, and right audio channel pre-emphasis filter circuitry having an output;
   (B) first summing circuitry having a first input coupled to the output of the left audio channel pre-emphasis filter circuitry, having a second input coupled to the output of the right audio channel pre-emphasis filter circuitry, and having an output;
   (C) first difference circuitry having a first input coupled to the output of the left audio channel pre-emphasis filter circuitry, having a second input coupled to the output of the right audio channel pre-emphasis filter circuitry, and having an output;
   (D) second summing circuitry having a first input coupled to the output of the first summing circuitry, a second input coupled to the output of the first difference circuitry, and an output;
   (E) frequency shifter circuitry having an input coupled to the output of the second summing circuitry, a second input receiving an audio frequency deviation factor, and a composite audio signal output;
   (F) left de-emphasis filter circuitry having an input coupled to the output of the left audio channel pre-emphasis filter circuitry, having a control parameter input coupled to the composite audio signal output, and an output coupled to the first inputs of the first summing circuitry and the first difference circuitry; and
   (G) right de-emphasis filter circuitry having an input coupled to the output of the right audio channel pre-emphasis filter circuitry, having a control parameter input coupled to the parameter input of the left variable de-emphasis filter circuitry, and an output coupled to the second inputs of the first summing circuitry and the first difference circuitry.

2. The circuitry of claim 1 including:
(i) envelope detector circuitry having an input coupled to the composite audio signal output and an output;
(ii) log level comparator circuitry having an input coupled to the output of the envelope detector circuitry and having an output; and
(iii) control circuitry having an input coupled to the output of the log level comparator circuitry and having a control parameter output coupled to the control parameter input of the left de-emphasis filter circuitry.

3. The circuitry of claim 1 including envelope detector circuitry having an input coupled to the composite audio signal output, a time constant input, and an output coupled to the control parameter input of the left de-emphasis filter circuitry.

4. The circuitry of claim 1 including log level comparator circuitry having an input coupled to the composite audio signal output, a reference level input, and an output coupled to the control parameter input of the left de-emphasis filter circuitry.

5. The circuitry of claim 1 including control circuitry having an input coupled to the composite audio signal output, a hysteresis input, a time constant input, and an output coupled to the control parameter input of the left de-emphasis filter circuitry.

6. The circuitry of claim 1 in which the left and right de-emphasis filter circuitry each have a time constant parameter input connected together in addition to the control parameter input.

7. A process of producing a composite audio signal to a frequency modulation circuit comprising:
(A) pre-emphasis filtering a left channel audio signal separately from pre-emphasis filtering a right channel audio signal;
(B) de-emphasis filtering the pre-emphasis filtered left channel audio signal in response to a control parameter separately from de-emphasis filtering the pre-emphasis filtered right channel audio signal in response to the control parameter;
(C) producing a composite audio signal to a frequency modulation circuit from the de-emphasis filtered left channel audio signal and the de-emphasis filtered right channel audio signal; and
(D) producing the control parameter from the composite audio signal.

8. The process of claim 7 in which producing the control parameter from the composite audio signal includes:
(i) producing an envelope detector output signal from the composite audio signal;
(ii) producing a log level comparison output signal from the envelope detector output signal;
(iii) producing the control parameter output from the log level comparator output signal.

9. The process of claim 7 in which producing the control parameter from the composite audio signal includes producing an envelope detector output signal from the composite audio signal and a time constant input signal.

10. The process of claim 7 in which producing the control parameter from the composite audio signal includes producing a log level comparison output signal from the composite audio signal and a reference level input signal.

11. The process of claim 7 in which producing the control parameter from the composite audio signal includes producing an the control parameter output from the composite audio signal, a hysteresis input signal, and a time constant input signal.

12. The process of claim 7 in which de-emphasis filtering the pre-emphasis filtered left and right channel audio signals includes de-emphasis filtering in response to a time constant parameter signal.

* * * * *